United States Patent
Lee et al.

(10) Patent No.: US 10,327,223 B2
(45) Date of Patent: Jun. 18, 2019

(54) METHOD AND APPARATUS FOR PERFORMING SWITCHING CONTROL BETWEEN UPLINK AND SIDELINK IN WIRELESS COMMUNICATION SYSTEM

(71) Applicant: LG ELECTRONICS INC., Seoul (KR)

(72) Inventors: Youngdae Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/538,427

(22) PCT Filed: Dec. 28, 2015

(86) PCT No.: PCT/KR2015/014364
§ 371 (c)(1),
(2) Date: Jun. 21, 2017

(87) PCT Pub. No.: WO2016/108554
PCT Pub. Date: Jul. 7, 2016

(65) Prior Publication Data
US 2018/0007606 A1    Jan. 4, 2018

Related U.S. Application Data

(60) Provisional application No. 62/097,589, filed on Dec. 30, 2014.

(51) Int. Cl.
*H04W 36/36*    (2009.01)
*H04W 4/04*    (2009.01)
(Continued)

(52) U.S. Cl.
CPC ......... *H04W 68/005* (2013.01); *H04W 4/046* (2013.01); *H04W 4/40* (2018.02);
(Continued)

(58) Field of Classification Search
CPC . H04W 36/36; H04W 36/0005; H04W 4/046; H04W 36/14
See application file for complete search history.

(56) References Cited

U.S. PATENT DOCUMENTS 8,260,287 B2    9/2012  Yi et al.
8,761,166 B2    6/2014  Scott et al.
(Continued)

FOREIGN PATENT DOCUMENTS

KR    10-2014-0033277 A    3/2014
WO    WO 2013/155443 A1    10/2013
(Continued)

OTHER PUBLICATIONS

Renesas Mobile Europe Ltd, "ProSe Scenarios and Use Cases," 3GPP TSG-RAN WG2 Meeting #83, R2-132652, Barcelona, Spain, Aug. 19-23, 2013 (Aug. 9, 2013), 7 pages.
(Continued)

*Primary Examiner* — Kamran Afshar
*Assistant Examiner* — Minjung Kim
(74) *Attorney, Agent, or Firm* — Birch, Stewart, Kolasch & Birch, LLP

(57) ABSTRACT

A method and apparatus for performing switching control between uplink (UL) and sidelink (SL) in a wireless communication system is provided. A user equipment (UE) receives control information for a transmission direction of a specific type of communication from a network, and determines one of the UL or the SL as the transmission direction of the specific type of communication based on the control information. The specific type of communication may correspond to vehicle-to-everything (V2X) communication.

7 Claims, 11 Drawing Sheets

(51) Int. Cl.

| | | |
|---|---|---|
| *H04W 36/00* | (2009.01) | |
| *H04W 36/14* | (2009.01) | |
| *H04W 68/00* | (2009.01) | |
| *H04W 12/08* | (2009.01) | |
| *H04W 72/02* | (2009.01) | |
| *H04W 72/12* | (2009.01) | |
| *H04W 72/14* | (2009.01) | |
| *H04W 4/70* | (2018.01) | |
| *H04W 76/14* | (2018.01) | |
| *H04W 12/02* | (2009.01) | |
| *H04W 72/04* | (2009.01) | |
| *H04W 28/02* | (2009.01) | |
| *H04W 4/46* | (2018.01) | |
| *H04W 76/10* | (2018.01) | |
| *H04W 4/40* | (2018.01) | |
| *H04W 80/02* | (2009.01) | |
| *H04W 4/80* | (2018.01) | |
| *H04L 9/32* | (2006.01) | |
| *H04W 84/00* | (2009.01) | |

(52) U.S. Cl.
CPC ............... *H04W 4/46* (2018.02); *H04W 4/70* (2018.02); *H04W 12/02* (2013.01); *H04W 12/08* (2013.01); *H04W 28/0278* (2013.01); *H04W 36/0005* (2013.01); *H04W 36/14* (2013.01); *H04W 36/36* (2013.01); *H04W 72/02* (2013.01); *H04W 72/042* (2013.01); *H04W 72/1268* (2013.01); *H04W 72/1284* (2013.01); *H04W 72/14* (2013.01); *H04W 76/10* (2018.02); *H04W 76/14* (2018.02); *H04L 9/3247* (2013.01); *H04L 2209/80* (2013.01); *H04L 2209/84* (2013.01); *H04W 4/80* (2018.02); *H04W 80/02* (2013.01); *H04W 84/005* (2013.01)

(56) References Cited

U.S. PATENT DOCUMENTS

| | | |
|---|---|---|
| 2007/0146162 A1 | 6/2007 | Tengler et al. |
| 2011/0040888 A1 | 2/2011 | Krishnaswamy et al. |
| 2011/0149814 A1 | 6/2011 | Mottier |
| 2012/0008586 A1* | 1/2012 | Kwon ............... H04L 5/0053 370/329 |
| 2012/0071185 A1 | 3/2012 | Dayal et al. |
| 2012/0163235 A1* | 6/2012 | Ho ..................... H04W 76/023 370/254 |
| 2012/0275391 A1 | 11/2012 | Cui et al. |
| 2013/0013181 A1 | 1/2013 | Wang et al. |
| 2013/0028184 A1 | 1/2013 | Lee et al. |
| 2013/0044706 A1 | 2/2013 | Suzuki et al. |
| 2013/0188612 A1 | 7/2013 | Dinan |
| 2013/0293394 A1 | 11/2013 | Rubin et al. |
| 2013/0294283 A1* | 11/2013 | Van Phan ............... H04W 4/00 370/252 |
| 2013/0310086 A1* | 11/2013 | Hu ....................... H04W 48/06 455/458 |
| 2013/0331125 A1 | 12/2013 | Dini et al. |
| 2014/0002276 A1 | 1/2014 | Iyer et al. |
| 2014/0010179 A1 | 1/2014 | Lee |
| 2014/0023008 A1 | 1/2014 | Ahn et al. |
| 2014/0126399 A1 | 5/2014 | Damnjanovic et al. |
| 2014/0179330 A1 | 6/2014 | Du et al. |
| 2014/0213186 A1 | 7/2014 | Gage et al. |
| 2014/0243038 A1 | 8/2014 | Schmidt et al. |
| 2014/0328329 A1 | 11/2014 | Novlan et al. |
| 2015/0003311 A1 | 1/2015 | Feuersaenger |
| 2015/0009910 A1 | 1/2015 | Ryu et al. |
| 2015/0078302 A1 | 3/2015 | Reial et al. |
| 2015/0163689 A1 | 6/2015 | Lee et al. |
| 2015/0195827 A1* | 7/2015 | Feng ..................... H04W 4/206 380/270 |
| 2015/0223155 A1 | 8/2015 | Turtinen et al. |
| 2015/0245397 A1* | 8/2015 | Sachs ................. H04W 76/023 455/426.1 |
| 2015/0271846 A1 | 9/2015 | Kowalski et al. |
| 2015/0271860 A1 | 9/2015 | Baghel |
| 2015/0296411 A1 | 10/2015 | Meyer et al. |
| 2015/0326484 A1 | 11/2015 | Cao et al. |
| 2015/0327157 A1 | 11/2015 | Al-Shalash |
| 2016/0044701 A1 | 2/2016 | Folke et al. |
| 2016/0057795 A1* | 2/2016 | Kim .................... H04W 76/023 370/329 |
| 2016/0066337 A1 | 3/2016 | Sartori et al. |
| 2016/0087804 A1 | 3/2016 | Park et al. |
| 2016/0094975 A1 | 3/2016 | Sheng |
| 2016/0128082 A1 | 5/2016 | Chen et al. |
| 2016/0135155 A1 | 5/2016 | Al-Shalash et al. |
| 2016/0174122 A1 | 6/2016 | Sorrentino et al. |
| 2016/0345357 A1* | 11/2016 | Fan ..................... H04W 74/006 |
| 2017/0041773 A1 | 2/2017 | Fujishiro et al. |
| 2017/0069207 A1 | 3/2017 | Ma |
| 2017/0230938 A1* | 8/2017 | Huang ................. H04W 72/04 |
| 2017/0251486 A1 | 8/2017 | Hu et al. |
| 2017/0367058 A1 | 12/2017 | Pelletier et al. |

FOREIGN PATENT DOCUMENTS

| | | |
|---|---|---|
| WO | WO 2013/101363 A1 | 12/2013 |
| WO | WO 2014/000183 A1 | 1/2014 |
| WO | WO 2014/012244 A1 | 1/2014 |
| WO | WO 2014/015470 A1 | 1/2014 |
| WO | WO 2014/064280 A1 | 5/2014 |
| WO | WO 2014/163287 A1 | 10/2014 |
| WO | WO 2014/179922 A1 | 11/2014 |

OTHER PUBLICATIONS

The Extended European Search Report, dated Jun. 8, 2018, for European Application No. 15875647.8 is provided.

The Extended European Search Report, dated Jul. 26, 2018, for European Application No. 15875645.2 is provided.

The U.S. Office Action, dated Jun. 14, 2018, for U.S. Appl. No. 15/536,637 is provided.

The U.S. Office Action, dated Jun. 15, 2018, for U.S. Appl. No. 15/541,010 is provided.

The U.S. Office Action, dated Jul. 6, 2018, for U.S. Appl. No. 15/540,542 is provided.

Qualcomm Incorporated et al., "Introduction of ProSe," 3GPP TSG-RAN WG2 #88, R2-145417, San Francisco, USA, Nov. 17-24, 2014, 37 pages, XP050920553.

Qualcomm Incorporated, "TP for D2D for TS 36.300," 3GPP TSG-RAN WG1 #78, R1-143678, Dresden, Germany, Aug. 18-22, 2014, pp. 1/1 to 19/1, XP050885117.

\* cited by examiner

[Fig. 1]
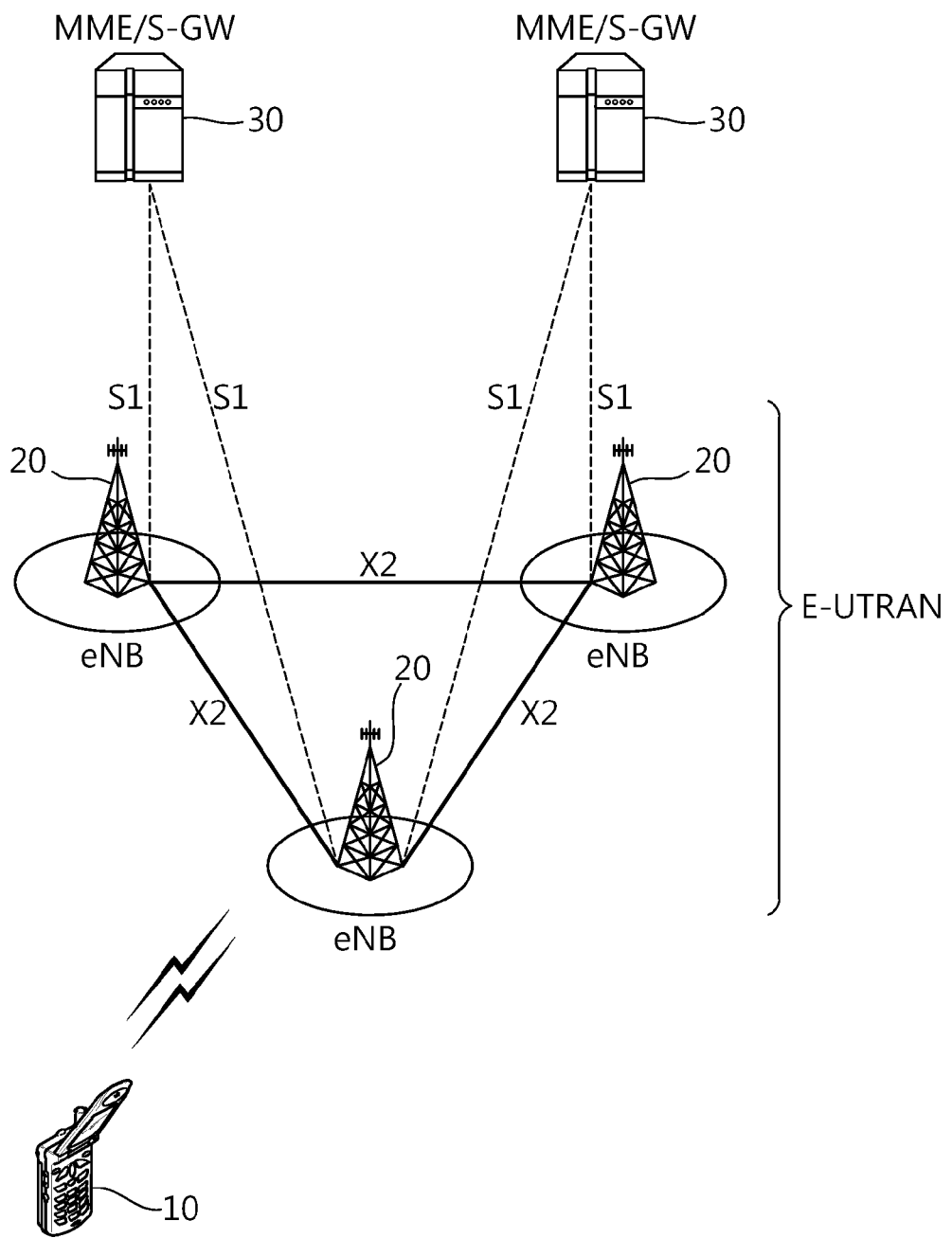

[Fig. 2]
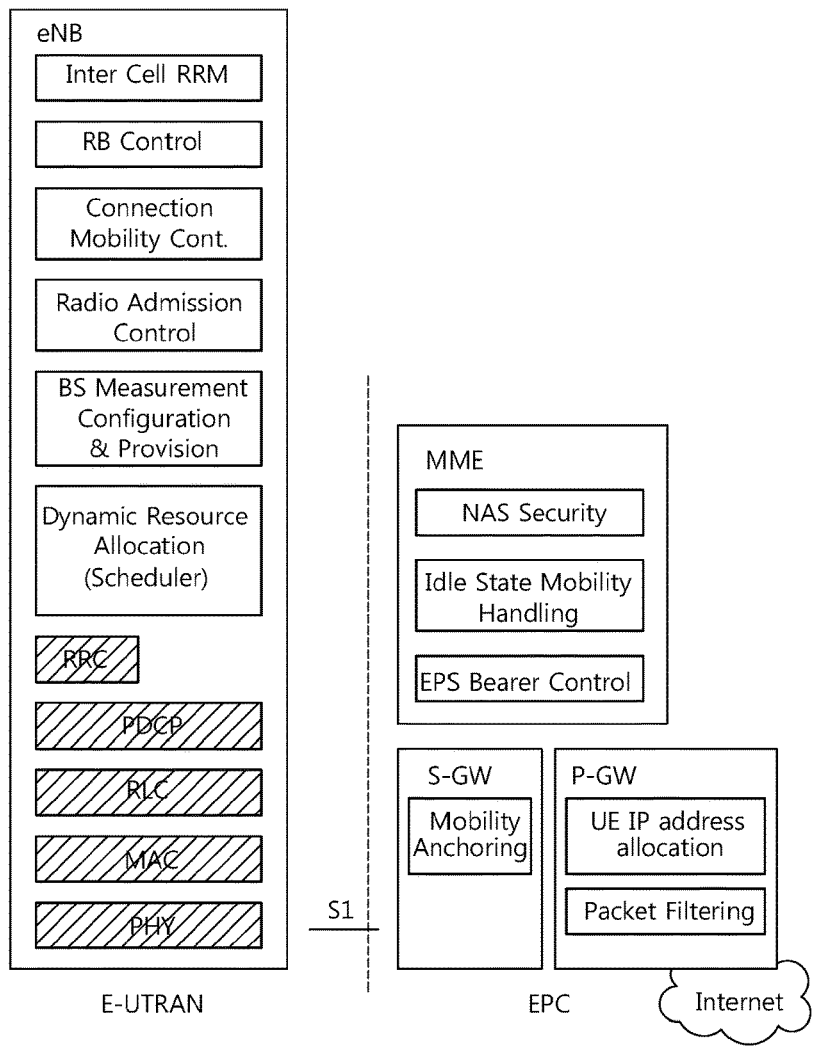
[Fig. 3]
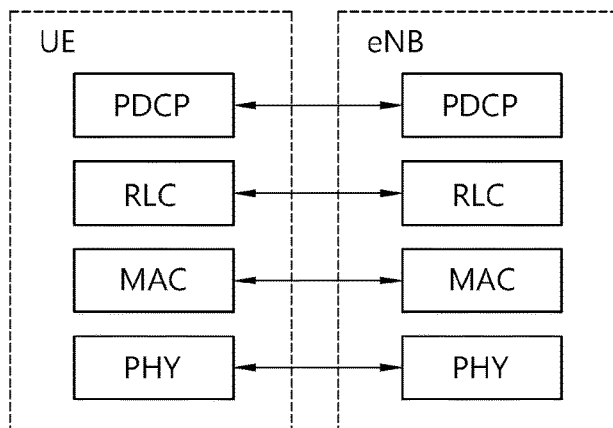

[Fig. 4]
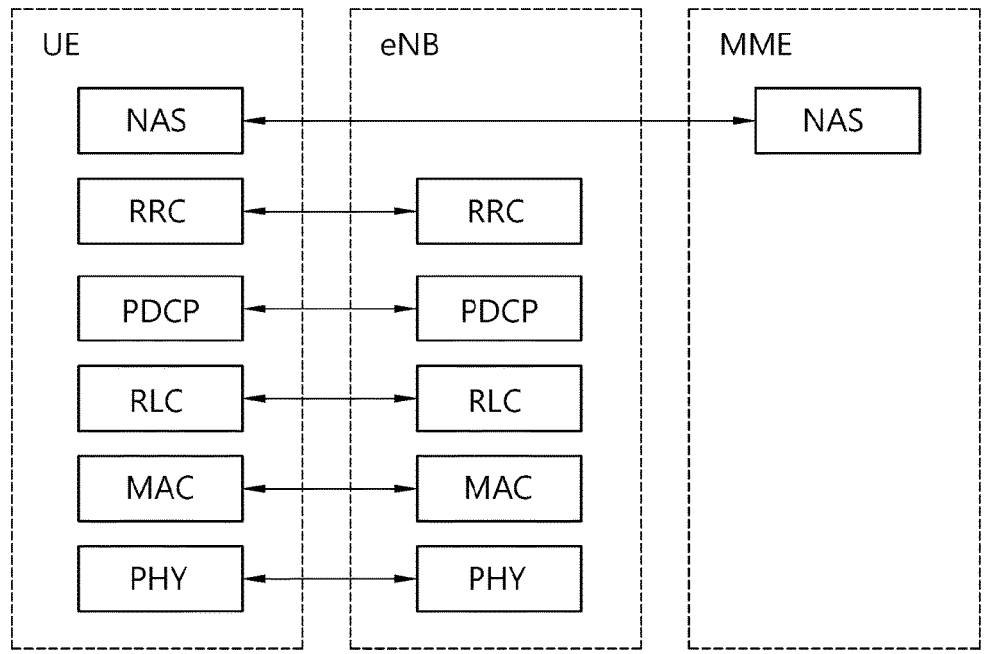
[Fig. 5]
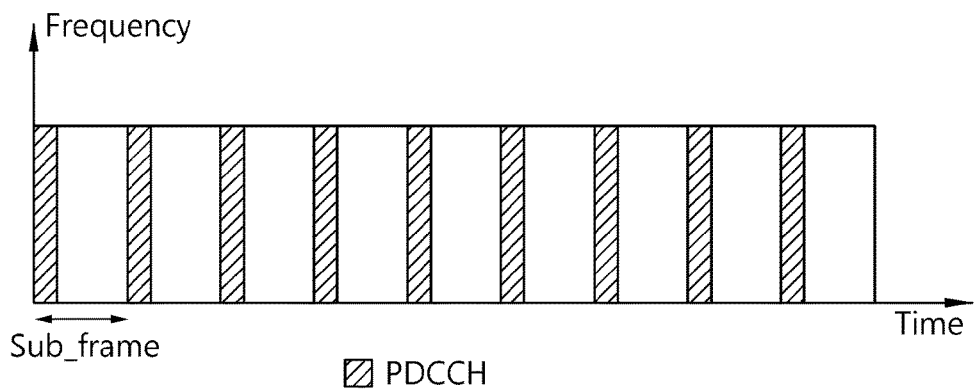
[Fig. 6]
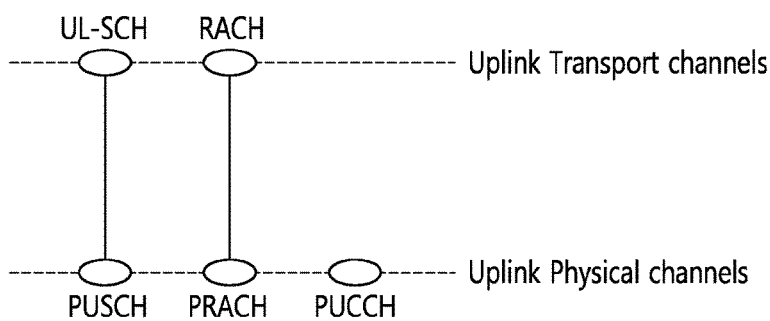

[Fig. 7]
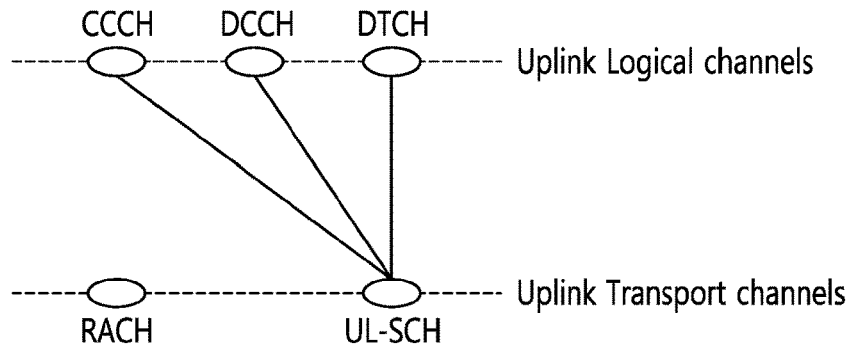
[Fig. 8]
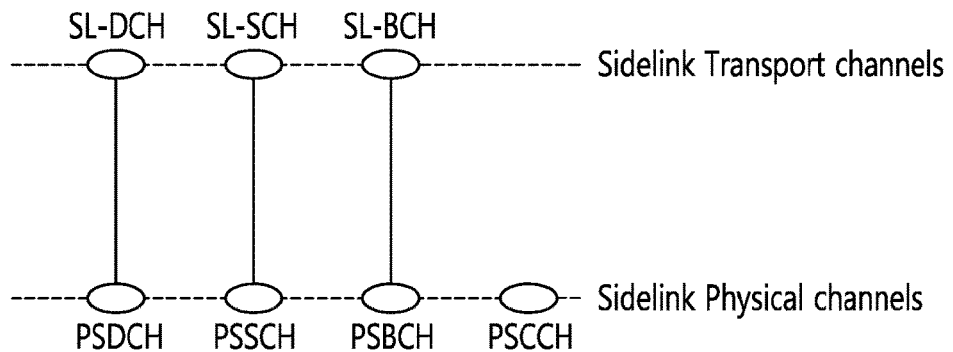
[Fig. 9]
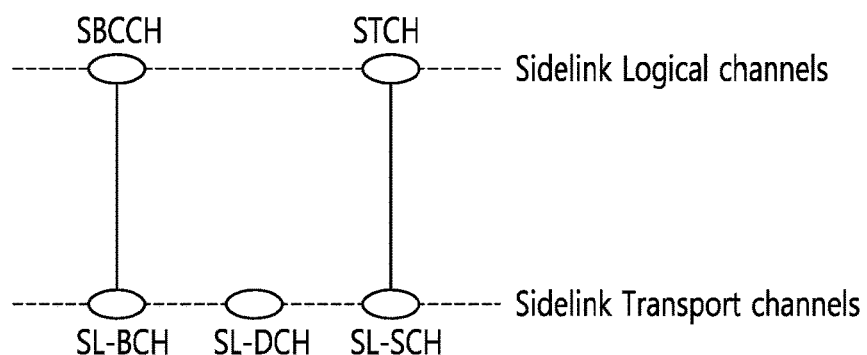
[Fig. 10]
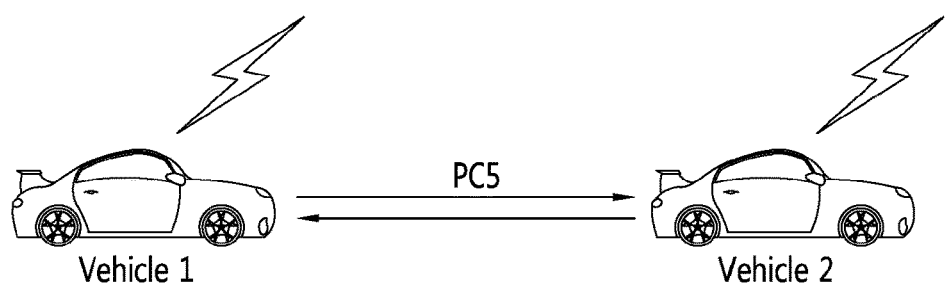

[Fig. 11]
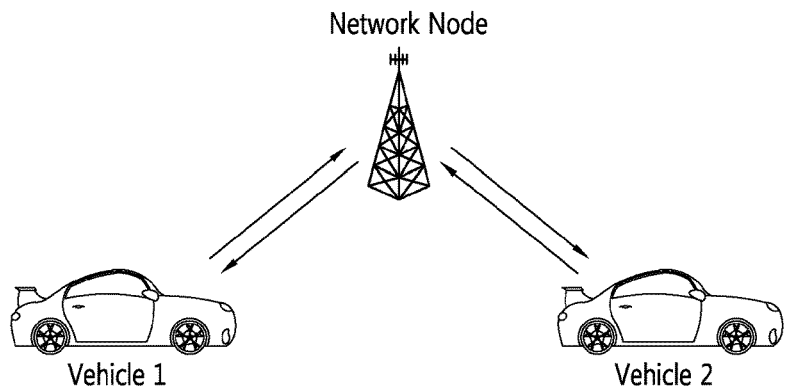
[Fig. 12]
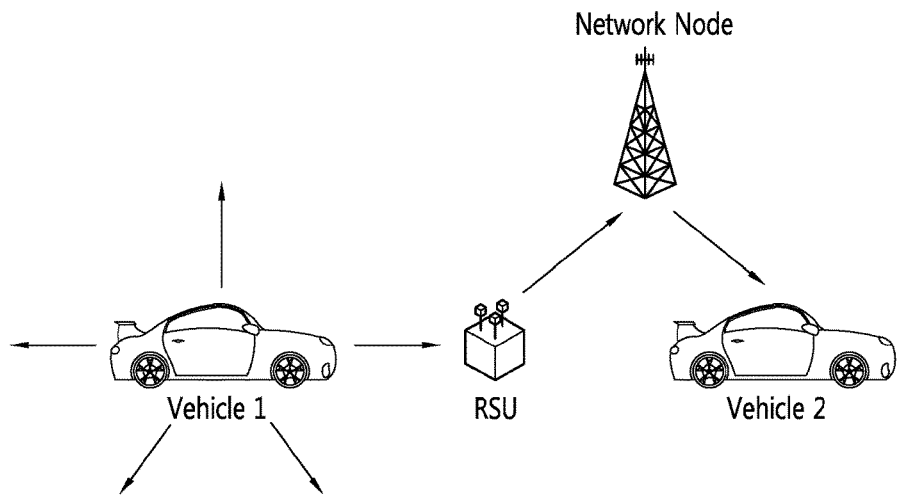
[Fig. 13]
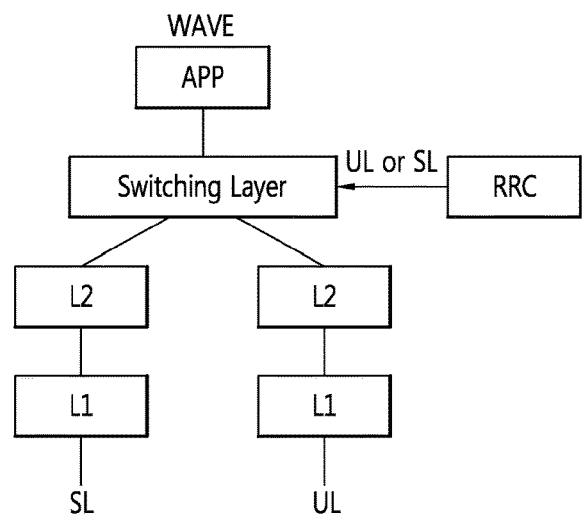

[Fig. 14]
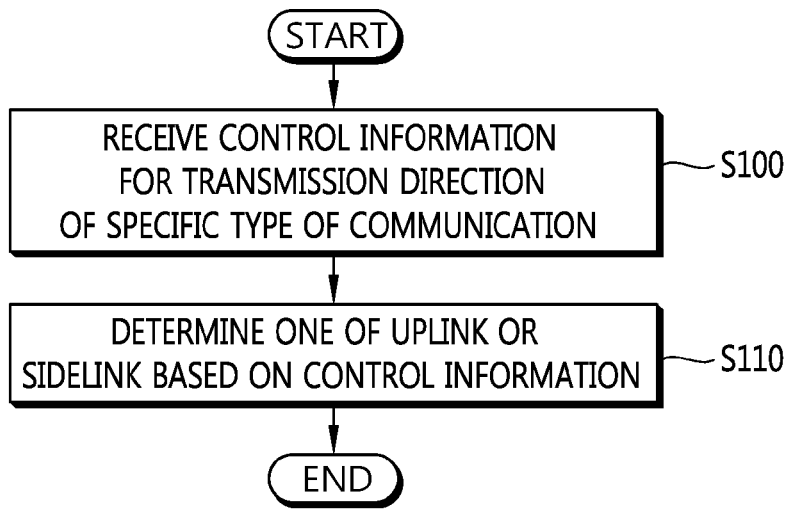

[Fig. 15]
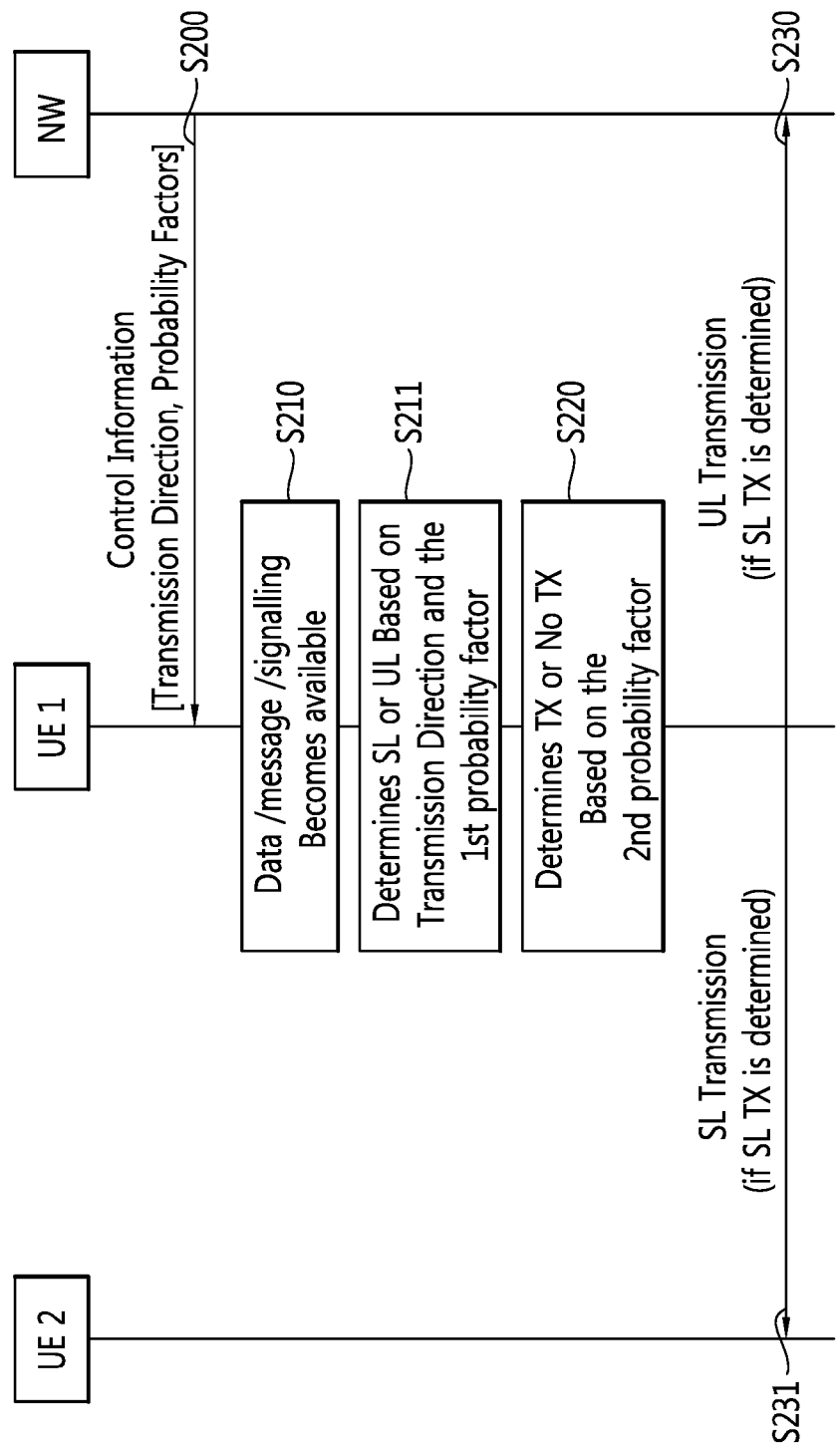

[Fig. 16]
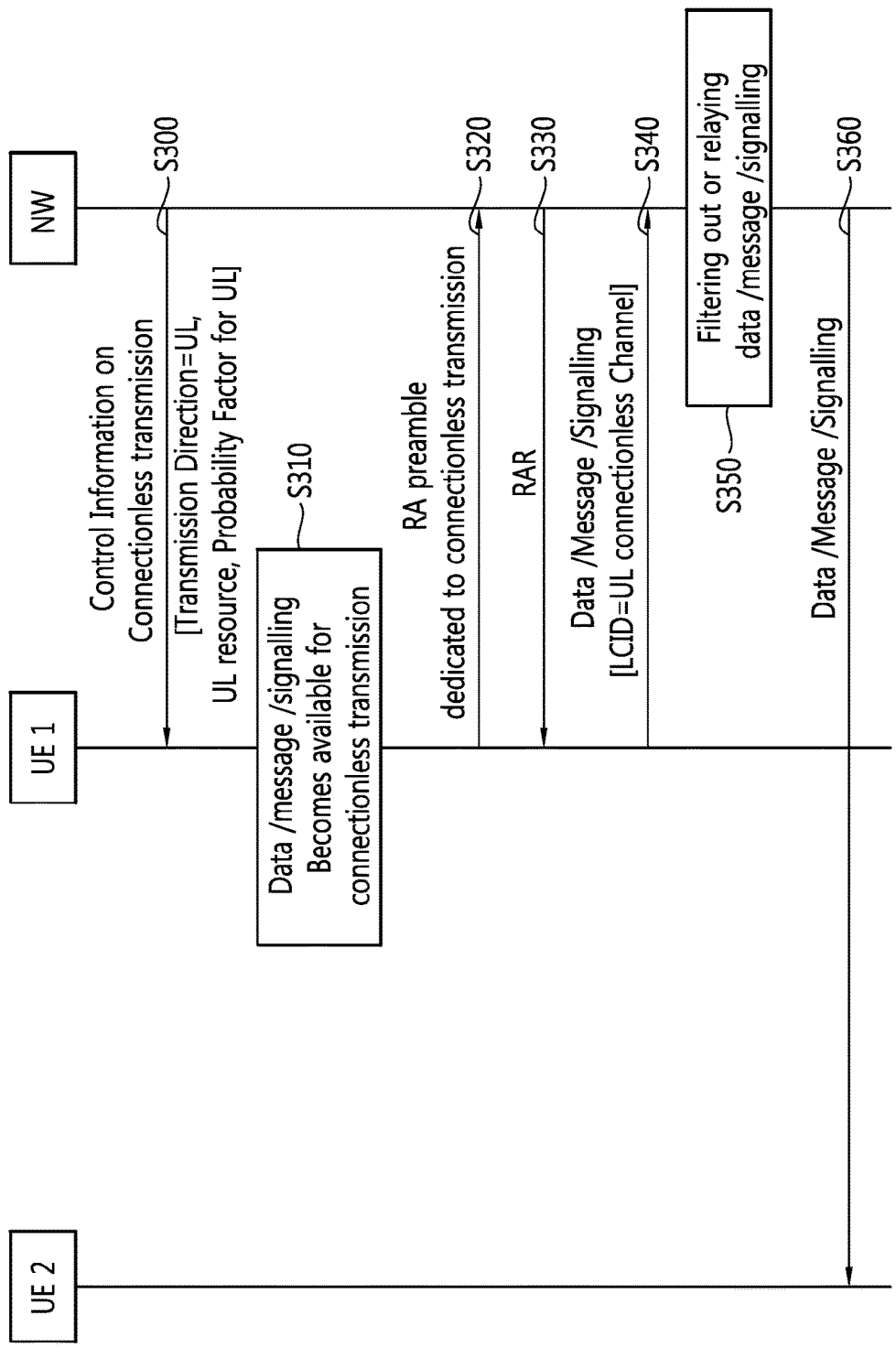

[Fig. 17]
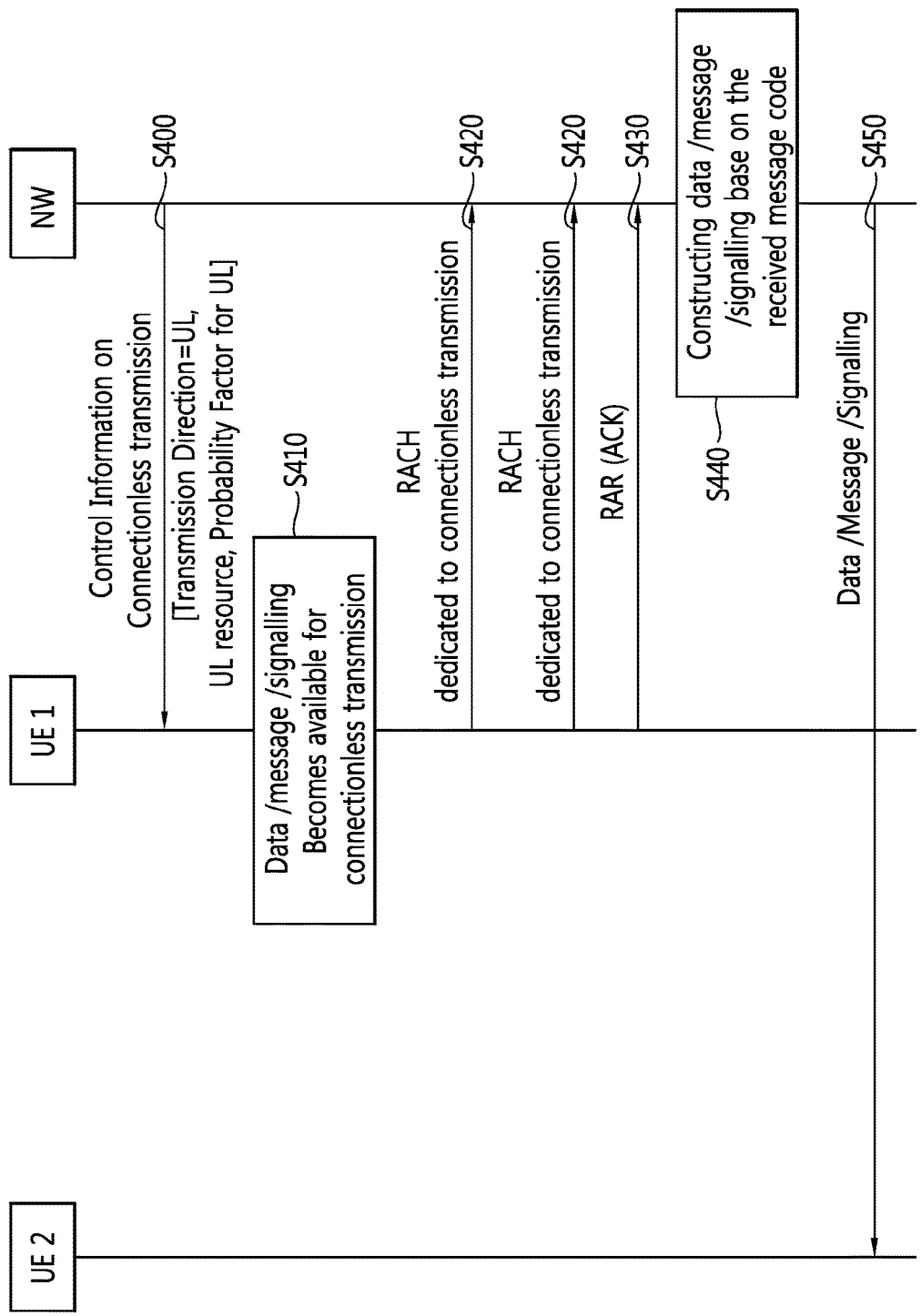

[Fig. 18]
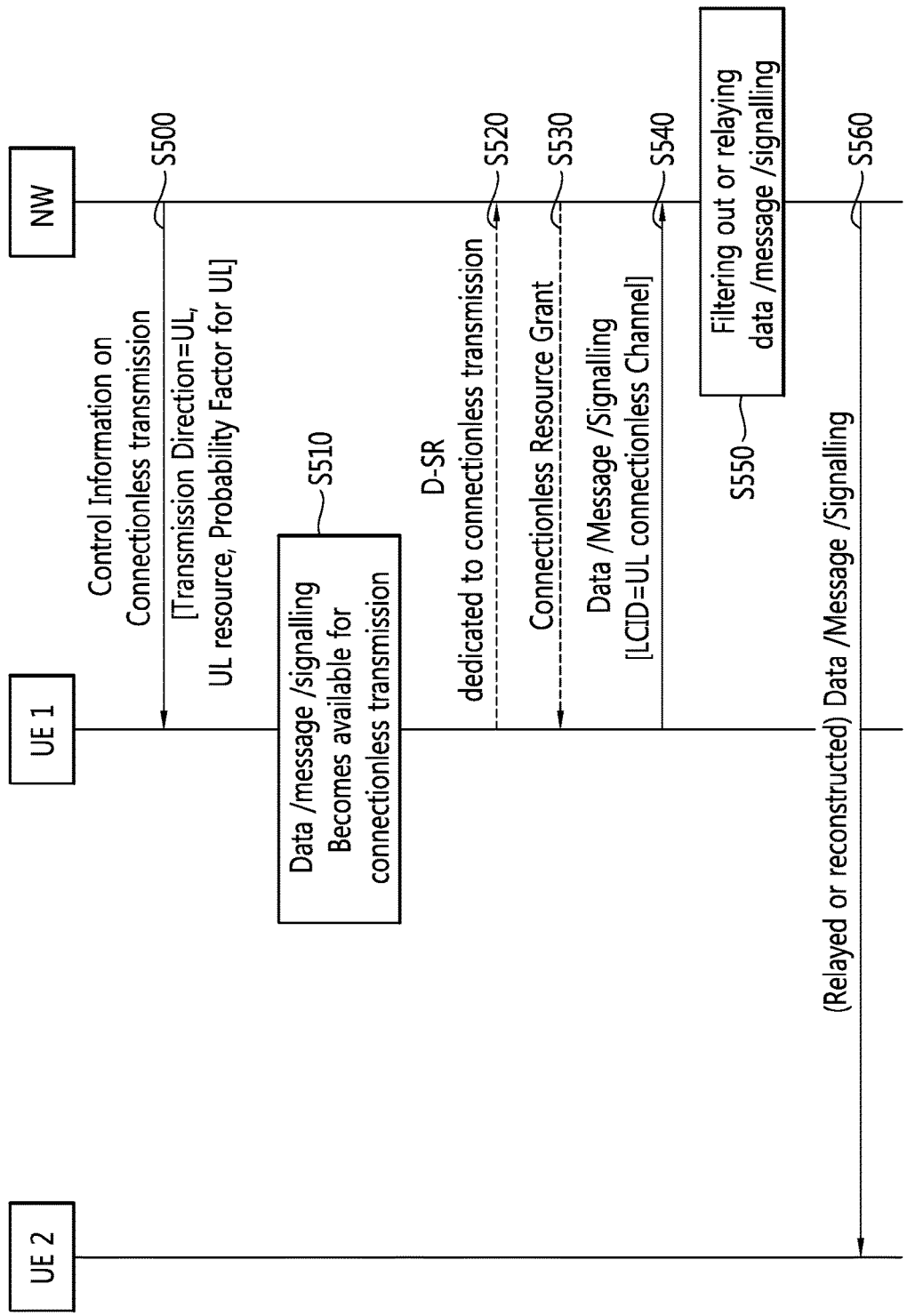

[Fig. 19]
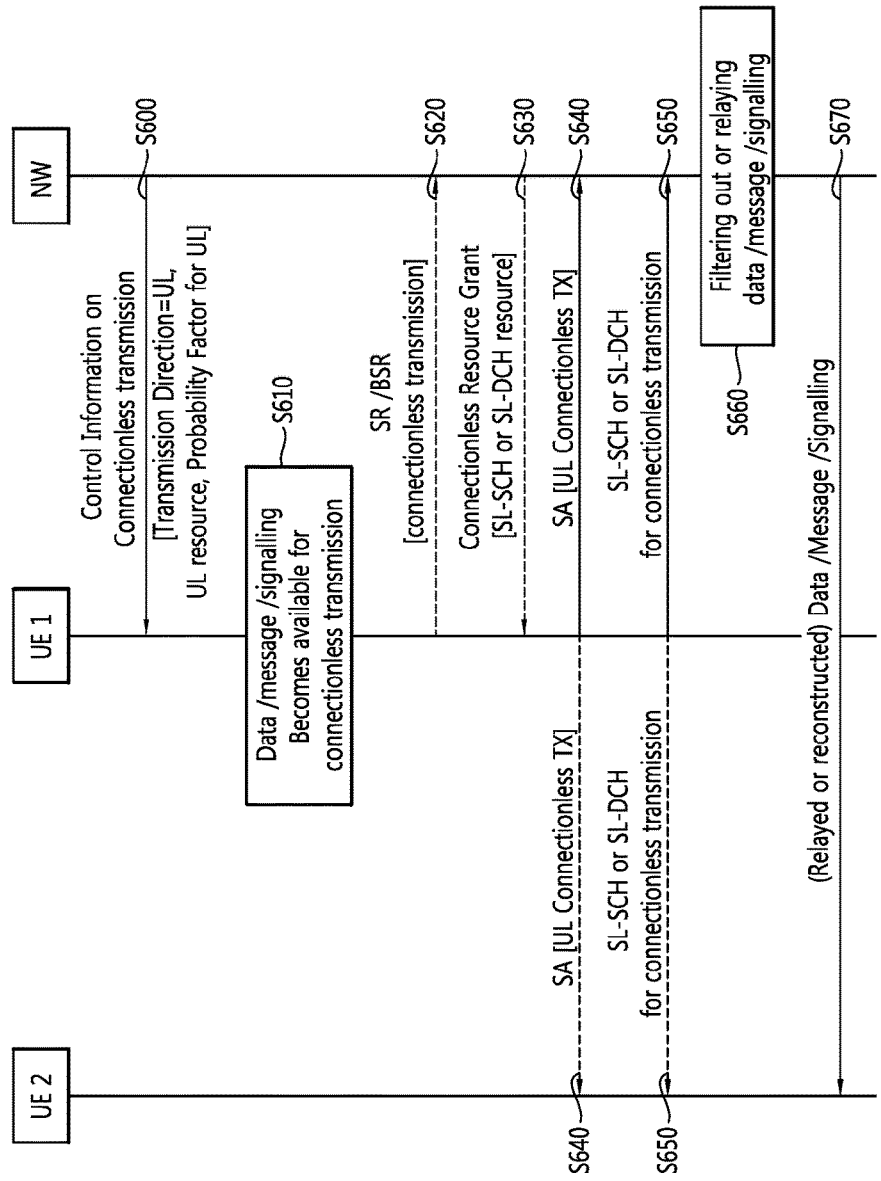
[Fig. 20]
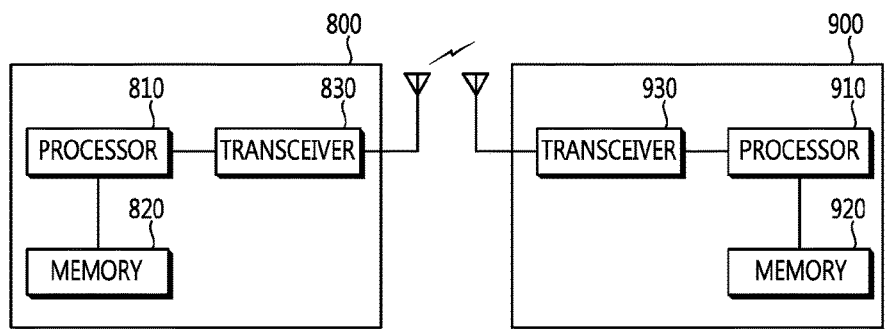

METHOD AND APPARATUS FOR PERFORMING SWITCHING CONTROL BETWEEN UPLINK AND SIDELINK IN WIRELESS COMMUNICATION SYSTEM

CROSS REFERENCE TO RELATED APPLICATIONS

This application is the National Phase of PCT International Application No. PCT/KR2015/014364, filed on Dec. 28, 2015, which claims priority under 35 U.S.C. 119(e) to U.S. Provisional Application No. 62/097,589, filed on Dec. 30, 2014, all of which are hereby expressly incorporated by reference into the present application.

TECHNICAL FIELD

The present invention relates to wireless communications, and more particularly, to a method and apparatus for performing switching control between uplink (UL) and sidelink (SL) in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Vehicle-to-everything (V2X) communication is the passing of information from a vehicle to any entity that may affect the vehicle, and vice versa. This information exchange can be used for a host of safety, mobility and environmental applications to include driver assistance and vehicle safety, speed adaptation and warning, emergency response, safety, traveler information, navigation, traffic operations and demand management, personal navigation, commercial fleet planning and payment transactions. There is significant societal benefit and commercial value to delivering safety, mobility and convenience applications that rely on V2X.

V2X applications span a host of media. Basic elements of V2X are the vehicle and its connectivity to any other intelligent transportation system (ITS) station. Therefore, V2X includes transceivers located on vehicles, mounted on the roadside infrastructure, in aftermarket devices, or within handheld devices. V2X communication may occur in some of contexts of vehicle to vehicle (V2V) communication, vehicle to infrastructure (V2I) communication, vehicle to pedestrian (V2P) (or other vulnerable road users) communication, or vehicle to home communication (V2H).

The wide variety of use cases cannot only be met with a short-range radio solution working in a peer to peer manner. Some V2X use cases require infrastructure assistance for communication, and some use cases can make use of smaller scale infrastructure such as small cells or methods such as relaying. For this, the 3GPP has a role to play in defining, examining and acting on the variety of use cases to support the V2X effort. 3GPP infrastructure and 3GPP proximity-based services (ProSe) can act in support and enhancement to dedicated short range communications (DSRC) to fulfil many use cases. There is also the opportunity for 3GPP to investigate modifications and enhancements to ProSe to meet or improve the performance of short range communications in terms of spectral efficiency, effective range, bandwidth and throughput, error resiliency, and improved latency.

Accordingly, various methods for performing V2X communication based on 3GPP technology needs to be defined.

DISCLOSURE OF INVENTION

Technical Problem

The present invention provides a method and apparatus for performing switching control between uplink (UL) and sidelink (SL) in a wireless communication system. The present invention provides a method and apparatus for determining one of UL or SL based on received control information for transmission direction of a specific type of communication. The present invention provides a method and apparatus for performing vehicle-to-everything (V2X) communication via either UL or SL.

Solution to Problem

In an aspect, a method for performing, by a user equipment (UE), switching control between uplink (UL) and sidelink (SL) in a wireless communication system is provided. The method includes receiving control information for a transmission direction of a specific type of communication from a network, and determining one of the UL or the SL as the transmission direction of the specific type of communication based on the control information.

In another aspect, a user equipment (UE) is provided. The UE includes a memory, a transceiver, and a processor coupled to the memory and the transceiver, and configured to control the transceiver to receive control information for a transmission direction of a specific type of communication from a network, and determine one of the UL or the SL as the transmission direction of the specific type of communication based on the control information.

Advantageous Effects of Invention

Transmission direction for V2X communication can be determined effectively.

BRIEF DESCRIPTION OF DRAWINGS

FIG. 1 shows LTE system architecture.

FIG. 2 shows a block diagram of architecture of a typical E-UTRAN and a typical EPC.

FIG. 3 shows a block diagram of a user plane protocol stack of an LTE system.

FIG. 4 shows a block diagram of a control plane protocol stack of an LTE system.

FIG. 5 shows an example of a physical channel structure.

FIG. 6 shows mapping between UL transport channels and UL physical channels.

FIG. 7 shows mapping between UL logical channels and UL transport channels.

FIG. 8 shows mapping between SL transport channels and SL physical channels.

FIG. 9 shows mapping between SL logical channels and SL transport channels for ProSe direct communication.

FIG. 10 shows an example of a scenario of V2X communication.

FIG. 11 shows another example of a scenario of V2X communication.

FIG. 12 shows another example of a scenario of V2X communication.

FIG. 13 shows an example of a switching layer performing switching control between UL and SL according to an embodiment of the present invention.

FIG. 14 shows a method for performing, by a UE, switching control between UL and SL according to an embodiment of the present invention.

FIG. 15 shows a method for performing, by a UE, switching control between UL and SL according to another embodiment of the present invention.

FIG. 16 shows a method for performing bi-directional transmission and/or connectionless transmission according to an embodiment of the present invention.

FIG. 17 shows a method for performing bi-directional transmission and/or connectionless transmission according to another embodiment of the present invention.

FIG. 18 shows a method for performing bi-directional transmission and/or connectionless transmission according to another embodiment of the present invention.

FIG. 19 shows a method for performing bi-directional transmission and/or connectionless transmission according to another embodiment of the present invention.

FIG. 20 shows a wireless communication system to implement an embodiment of the present invention.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink LTE-advance (LTE-A) is an evolution of the 3GPP LTE.

For clarity, the following description will focus on the LTE-A. However, technical features of the present invention are not limited thereto.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARM). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

FIG. 6 shows mapping between UL transport channels and UL physical channels. Referring to FIG. 6, an uplink shared channel (UL-SCH) may be mapped to a physical uplink shared channel (PUSCH). The UL-SCH may be characterized by:

possibility to use beamforming;
support for dynamic link adaptation by varying the transmit power and potentially modulation and coding;
support for HARQ;
support for both dynamic and semi-static resource allocation.

Further, a random access channel (RACH) may be mapped to a physical random access channel (PRACH). The RACH may be characterized by:

limited control information;
collision risk.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

FIG. 7 shows mapping between UL logical channels and UL transport channels. Referring to FIG. 7, the CCCH may be mapped to the UL-SCH. The DCCH may be mapped to the UL-SCH. The DTCH may be mapped to the UL-SCH.

An RRC state indicates whether an RRC layer of the UE is logically connected to an RRC layer of the E-UTRAN.

The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Proximity-based services (ProSe) are described. "ProSe" may be used mixed with "D2D". ProSe direct communication means a communication between two or more UEs in proximity that are ProSe-enabled, by means of user plane transmission using E-UTRA technology via a path not traversing any network node. ProSe-enabled UE means a UE that supports ProSe requirements and associated procedures. Unless explicitly stated otherwise, a ProSe-enabled UE refers both to a non-public safety UE and a public safety UE. ProSe-enabled public safety UE means a ProSe-enabled UE that also supports ProSe procedures and capabilities specific to public safety. ProSe-enabled non-public safety UE means a UE that supports ProSe procedures and but not capabilities specific to public safety. ProSe direct discovery means a procedure employed by a ProSe-enabled UE to discover other ProSe-enabled UEs in its vicinity by using only the capabilities of the two UEs with 3GPP LTE rel-12 technology. EPC-level ProSe discovery means a process by which the EPC determines the proximity of two ProSe-enabled UEs and informs them of their proximity. ProSe UE identity (ID) is a unique identity allocated by evolved packet system (EPS) which identifies the ProSe enabled UE. ProSe application ID is an identity identifying application related information for the ProSe enabled UE.

Sidelink (SL) is UE to UE interface for ProSe direct communication and ProSe direct discovery. The sidelink corresponds to the PC5 interface. Sidelink comprises ProSe direct discovery and ProSe direct communication between UEs. Sidelink uses UL resources and physical channel structure similar to UL transmissions. Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

FIG. 8 shows mapping between SL transport channels and SL physical channels. Referring to FIG. 8, a SL discovery channel (SL-DCH) may be mapped to a physical SL discovery channel (PSDCH), which carries ProSe direct discovery message from the UE. The SL-DCH is characterized by:

fixed size, pre-defined format periodic broadcast transmission;
support for both UE autonomous resource selection and scheduled resource allocation by eNB;
collision risk due to support of UE autonomous resource selection; no collision when UE is allocated dedicated resources by the eNB.

Further, a SL shared channel (SL-SCH) may be mapped to a physical SL shared channel (PSSCH), which carries data from a UE for ProSe direct communication. The SL-SCH is characterized by:

support for broadcast transmission;
support for both UE autonomous resource selection and scheduled resource allocation by eNB;
collision risk due to support of UE autonomous resource selection; no collision when UE is allocated dedicated resources by the eNB;
support for HARQ combining, but no support for HARQ feedback;
support for dynamic link adaptation by varying the transmit power, modulation and coding.

Further, a SL broadcast channel (SL-BCH) may be mapped to a physical SL broadcast channel (PSBCH), which carries system and synchronization related information transmitted from the UE. The SL-BCH is characterized by pre-defined transport format.

A physical SL control channel (PSCCH) carries control from a UE for ProSe direct communication. The PSCCH is mapped to the SL control resources. The PSCCH indicates resource and other transmission parameters used by a UE for PSSCH.

FIG. 9 shows mapping between SL logical channels and SL transport channels for ProSe direct communication. Referring to FIG. 9, a SL broadcast control channel (SBCCH) may be mapped to the SL-BCH. The SBCCH is a SL channel for broadcasting SL system information from one UE to other UE(s). This channel is used only by ProSe direct communication capable UEs. Further, a SL traffic channel (STCH) may be mapped to the SL-SCH. The STCH is a point-to-multipoint channel, for transfer of user information from one UE to other UEs. This channel is used only by ProSe direct communication capable UEs.

The vehicular communication, referred to as vehicle-to-everything (V2X), contains three different types, which are vehicle-to-vehicle (V2V) communications, vehicle-to-infrastructure (V2I) communications, and vehicle-to-pedestrian (V2P) communications. These three types of V2X can use "co-operative awareness" to provide more intelligent services for end-users. This means that transport entities, such as vehicles, roadside infrastructure, and pedestrians, can collect knowledge of their local environment (e.g. information received from other vehicles or sensor equipment in proximity) to process and share that knowledge in order to provide more intelligent services, such as cooperative collision warning or autonomous driving.

V2X service is a type of communication service that involves a transmitting or receiving UE using V2V application via 3GPP transport. Based on the other party involved in the communication, it can be further divided into V2V service, V2I service, V2P service. V2V service is a type of V2X service, where both parties of the communication are UEs using V2V application. V2I service is a type of V2X Service, where one party is a UE and the other party is a road side unit (RSU) both using V2I application. The RSU is an entity supporting V2I service that can transmit to, and receive from a UE using V2I application. RSU is implemented in an eNB or a stationary UE. V2P service is a type of V2X service, where both parties of the communication are UEs using V2P application.

For V2V, E-UTRAN allows such UEs that are in proximity of each other to exchange V2V-related information using E-UTRA(N) when permission, authorization and proximity criteria are fulfilled. The proximity criteria can be configured by the mobile network operator (MNO). However, UEs supporting V2V service can exchange such information when served by or not served by E-UTRAN which supports V2X Service. The UE supporting V2V applications transmits application layer information (e.g. about its location, dynamics, and attributes as part of the V2V service). The V2V payload must be flexible in order to accommodate different information contents, and the information can be transmitted periodically according to a configuration provided by the MNO. V2V is predominantly broadcast-based. V2V includes the exchange of V2V-related application information between distinct UEs directly and/or, due to the limited direct communication range of V2V, the exchange of V2V-related application information between distinct UEs via infrastructure supporting V2X service, e.g., RSU, application server, etc.

For V2I, the UE supporting V2I applications sends application layer information to RSU. RSU sends application layer information to a group of UEs or a UE supporting V2I applications. Vehicle-to-network (V2N) is also introduced where one party is a UE and the other party is a serving entity, both supporting V2N applications and communicating with each other via LTE network.

For V2P, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P service can exchange such information even when not served by E-UTRAN which supports V2X Service. The UE supporting V2P applications transmits application layer information. Such information can be broadcast by a vehicle with UE supporting V2X service (e.g., warning to pedestrian), and/or by a pedestrian with UE supporting V2X service (e.g., warning to vehicle). V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X service, e.g., RSU, application server, etc.

FIG. 10 shows an example of a scenario of V2X communication. Referring to FIG. 10, vehicle 1 and vehicle 2 are communicated with each other directly via PC5 interface.

FIG. 11 shows another example of a scenario of V2X communication. Referring to FIG. 11, vehicle 1 and vehicle 2 are communicated with each other indirectly via the network. The network node may be one of an eNB, a new entity for V2X communication, a new gateway for V2X communication, a RSU, etc. The network node may not be the MME or S-GW.

FIG. 12 shows another example of a scenario of V2X communication. Referring to FIG. 12, vehicle 1 broadcasts data, and the RSU receives the broadcast data. The RSU and vehicle 2 are communicated with each other indirectly via the network. The network node may be one of an eNB, a new entity for V2X communication, a new gateway for V2X communication, a RSU, etc. The network node may not be the MME or S-GW.

As described above, in 3GPP rel-12, ProSe allows a UE to discover another UE within an authorized range either directly or with the network assistance. The discovery process is under network control, and provides additional service related information to the discoverer UE. In addition, for public safety use, the UEs within the allowed range are able to directly communicate with each other using group based communication. Further in 3GPP rel-13, there are plans for further enhancements to ProSe to support restricted discovery and targeted discovery, in which the user is able to control who can discover him/her, and to operate in a mode to only announce upon a request. The one-to-one communication and relay support are also considered to be added for direct communication.

All these features can find a good application in the V2X use cases. However, in 3GPP rel-12 and rel-13, the ProSe has been designed for use with pedestrian mobility speed. It would therefore not be able to be used directly for V2X. For example, the physical channel assumptions may not be suitable for direct discovery and communication in vehicle speed, and UE to network signaling delays would limit its usefulness for V2X. Enhancements are necessary to adapt the ProSe system to support V2X.

When the current ProSe is used for V2X communication, the following problems may occur.

(1) In urban area, the number of vehicles is expected to be large. In such dense scenario, there may be many vehicles that transmit road safety messages on SL, so that SL resources may be highly utilized and collision probability will be normally high. Such problem will cause unstable intelligent transportation system (ITS) service to vehicles. In this sense, offloading ITS traffic from SL to another direction may be beneficial.

(2) V2V and V2I communication may normally happen in a local area. V2V and V2I communication may not aim at a specific user. Rather, this communication may be open to all neighboring vehicles in a local area. In addition, such communication will require lower latency. Thus, fast broadcast mechanism may be needed.

In order to solve the problem described above, according to an embodiment of the present invention, a method for performing switching control between UL and SL for V2X communication may be proposed. According to an embodiment of the present invention, transmission direction between UL and SL may be selected under network control.

FIG. 13 shows an example of a switching layer performing switching control between UL and SL according to an embodiment of the present invention. Referring to FIG. 13, the application layer may provide V2X communication. According to an embodiment of the present invention, the switching layer may be added between the application layer and L2 (i.e. PDCP/RLC/MAC layer). The switching layer may perform switching control between UL and SL upon receiving control information for a transmission direction of the V2X communication. The control information may be received from the RRC layer. The control information may be described in detail below. The UE may perform V2X communication via the determined UL or SL by the switching layer.

FIG. 14 shows a method for performing, by a UE, switching control between UL and SL according to an embodiment of the present invention. The UE may a vehicle.

In step S100, the UE receives control information for a transmission direction of a specific type of communication from a network. The control information may indicate one of the UL or the SL. Or, the control information may include a probability factor for the transmission direction. Or, the control information may include a first probability factor for the UL and a second probability factor for the SL. The control information may be provided per RRC state. The control information may be received from a RRC layer of the UE. The specific type of communication may be a vehicular communication between vehicles or between a vehicle and other type of device. The other type of device is one of an eNB, a new entity for the vehicular communication, a new gateway for the vehicular communication, or a RSU.

In step S110, the UE determines one of the UL or the SL as the transmission direction of the specific type of communication based on the control information. When the control information may include a probability factor for the transmission direction, one of the UL or the SL may be determined based on the probability factor. One of the UL or the SL may be determined by comparing the probability factor with a random number. Determining one of the UL or the SL may be performed at a switching layer of the UE. The UE may perform the specific type of communication via the determined one of the UL or the SL. The data/message/signaling may be transmitted with a digital signature or encryption.

Based on the above description according to embodiments of the present invention, various methods for performing switching control between UL and SL according to embodiments of the present invention are described below.

Hereinafter, the connectionless transmission may be a specific type of UE-to-UE transmission via network. In connectionless transmission, data/message/signaling may not be routed to the S-GW, but it may be transferred from one or more UEs to one or more other UEs via network. The network node may be one of an eNB, a new entity for V2X communication, a new gateway for V2X communication, a RSU, etc. The network node may not be the MME or S-GW. Data/message/signaling may be specific to V2X communication, i.e. communication between vehicles or communication between a vehicle and other type of device. The connectionless transmission may be efficient for V2X communication, because connectionless transmission would not require connection establishment/management between the network and vehicles. Further, the bi-directional transmission may consist of UL transmission and SL transmission. In the bi-directional transmission, traffic may be transmitted in either UL or in SL. Or, in the bi-directional transmission, transmission from a UE to another UE may be performed in either UL or in SL.

FIG. 15 shows a method for performing, by a UE, switching control between UL and SL according to another embodiment of the present invention. The UE may a vehicle. In this embodiment, when data/message/signaling is available for bi-directional transmission (i.e. for both UL and SL), the UE may decide whether to perform UL transmission or to perform SL transmission based on control information received from the network, e.g. for each transmission, each MAC/RLC PDU, each message or each signaling. The control information received from the network may include transmission direction indication that indicates whether the UE perform UL transmission or SL transmission for the specific data or for the specific message/signaling, such as V2V messages related to road safety. The control information may be applicable only for UEs in RRC_CONNECTED or for UEs in RRC_IDLE. Different control information may be provided for UEs in RRC_CONNECTED and for UEs in RRC_IDLE. The control information may be broadcast on BCCH, signaled on a dedicated message on DCCH, or signaled on a MAC control element (CE). The control information may include a probability factor for transmission direction between UL and SL, so that the UE can select either UL or SL based on the probability factor.

In step S200, the UE receives control information from the network. The control information may include at least one of the following elements.

Transmission direction: The transmission direction may indicate whether the UE perform UL transmission or SL transmission for transmission of a specific data/message/signaling. That is, the transmission direction may indicate one of UL or SL. The transmission direction may be provided per RRC state or per PLMN serving UE, i.e. different information element sets may be provided for RRC_IDLE and RRC_CONNECTED.

Probability factor for transmission direction: The UE may use the probability factor to select one of UL transmission and SL transmission, e.g. for each PDU, each message or each signaling (or to select one of UL, SL and no transmission). The network may control the ratio of SL transmission over UL transmissions based on this probability factor.

Probability factor for UL transmission and/or a probability factor for SL transmission: The UE may use the probability factor to select either 'transmission' or 'no transmission', e.g. for each PDU, each message or each signaling. The UE may determine whether or not to perform the corresponding transmission for transmission of a specific data/message/signaling. The network may control the number of SL/UL transmissions based on this probability factor.

Different probability factors may be included for different use cases or for different message/signaling types.

In step S210, the UE detects that data/message/signaling becomes available for transmission. In step S211, the UE selects either UL transmission or SL transmission based on the transmission direction and/or probability factor for transmission direction, which may be included in the received control information. The UE may select one direction, e.g. for each transmission, each MAC/RLC PDU, each message, or each signaling. If the probability factor is received by the UE and so available in the UE, the UE may draw a random value and compare the probability factor with the random value. The UE may decide the transmission direction based on this comparison. Alternatively, the UE may select one of UL, SL or no transmission based the received control information.

If transmission direction is provided for RRC_IDLE, the UE may decide the transmission direction, if available, based on the probability factor while UE is in RRC_IDLE. While UE is in RRC_CONNECTED, the UE may not perform transmission, or the UE may always perform SL transmission, or the UE may always perform UL transmission. If transmission direction is provided for RRC_CONNECTED, the UE may decide the transmission direction, if available, based on the probability factor while UE is in RRC_CONNECTED. While UE is in RRC_IDLE, the UE may not perform transmission or the UE may always perform SL transmission. If transmission direction is provided without specific RRC state, the UE may decide the transmission direction, if available, based on the probability factor while UE is in any RRC state. If transmission direction is not provided, for either both RRC states or one of RRC states, the UE may not perform transmission or the UE may always perform SL transmission.

In step S220, the UE determines whether or not to perform the transmission on the selected transmission direction based on the probability factor, after the UE decides to perform UL transmission or SL transmission. For this process, the UE may draw a random value and compares the random value with the probability factor. The UE may determine whether or not to transmit on the selected transmission direction based on this comparison. Step S220 may be performed before step S211.

In step S230 and step S231, the UE perform transmission on the selected transmission direction, i.e. either UL (step S230) or SL (step S231), if UE decides to perform transmission on the selected transmission direction. The UE may repeat the transmission on the selected transmission direction, e.g. in PHY layer, MAC layer or RLC layer. During UL transmission, the UE may indicate to the network that this UL transmission is specific to the specific message/signaling such as V2X messages related to road safety. During SL transmission, the UE may indicate to another UE that this SL transmission is specific to the specific message/signaling such as V2X messages related to road safety. The SL transmission may be performed on one of SL channels, such as SL-SCH, SL-DCH and SL-BCH. The data/message/signaling may be transmitted with a digital signature or encryption.

FIG. 16 shows a method for performing bi-directional transmission and/or connectionless transmission according to an embodiment of the present invention. According to this embodiment, bi-directional transmission and/or connectionless transmission may be performed for communication between UEs via network based on a random access. According to this embodiment, when data/message/signaling is available for bidirectional transmission and/or connectionless transmission, the UE may transmit a random access preamble dedicated to bi-directional transmission and/or connectionless transmission. Upon receiving the random access response, the UE may perform UL transmission and/or SL transmission indicating bi-directional transmission and/or connectionless transmission. In this embodiment, it is assumed that UL transmission is selected. The UE may be in RRC_IDLE or RRC_CONNECTED.

In step S300, the UE receives control information on bi-directional transmission and/or connectionless transmission at a cell. The control information may indicate that the cell supports bi-directional transmission and/or connectionless transmission. The control information may indicate transmission direction, if this transmission corresponds to bi-directional transmission by which the UE can transmit a packet in UL or in SL. The control information may include UL resource pool and/or SL resource pool, used for bi-directional transmission and/or connectionless transmission. The control information may further include a first probability factor controlling whether the UE selects UL or SL for bi-directional transmission and/or a second probability factor controlling whether or not the UE can perform connectionless transmission. The control information may include a set of random access preamble IDs and time resource for this set of preambles.

In step S310, the UE detects data available for bi-directional transmission and/or connectionless transmission. There may be a specific type of logical/transport channel for bi-directional transmission. There may be a specific logical/transport channel for connectionless transmission, which is called connectionless channel.

In step S320, the UE transmits a random access preamble ID dedicated to bidirectional transmission and/or connectionless transmission. Before this step, the UE may select UL or SL for bi-directional transmission based on the received first probability factor and/or determine whether or not to perform connectionless transmission based on the received second probability factor. As described above, in this embodiment, the UL transmission is selected.

In step S330, the UE receives a random access response including UL grant. The grant may be received on PDCCH/ePDCCH which includes a specific RNTI specific to bi-directional transmission. Or, the grant may include a specific RNTI specific to connectionless transmission (CL-RNTI).

In step S340, upon receiving the UL grant, the UE may perform UL transmission indicating bi-directional transmission and/or UL connectionless transmission to transmit the data/message/signaling. The data/message/signaling may be transmitted with a digital signature or encryption. Before this step, the UE may select UL or SL for bidirectional transmission based on the received first probability factor and/or determine whether or not to perform connectionless transmission based on the received second probability factor. As described above, in this embodiment, the UL transmission is selected.

Upon receiving data/message/signaling by UL connectionless transmission, in step S350, a network node (e.g. eNB) determines whether or not to relay the received data/message/signaling to one or more other UE(s) in the cell or in a specific area. The network node may receive similar data/message/signaling from many UEs in the cell from the same UL connectionless channel. The network node may detect duplicated data/message/signaling, so that the network node may not relay all the received ones. Rather, the network node may select one or some of the received ones for relaying. Alternatively, the network node may re-construct a new data/message/signaling based on the received ones, and transmit the re-constructed data/message/signaling to one or more other UEs in the cell or in a specific area.

In step S360, the network node may perform DL transmission either for relaying the received data/message/signaling or for transmitting new data/message/signaling reconstructed based on the received data/message/signaling.

FIG. 17 shows a method for performing bi-directional transmission and/or connectionless transmission according to another embodiment of the present invention. This embodiment is similar to the embodiment described in FIG. 16, but some steps are modified compared with the embodiment described in FIG. 16. According to this embodiment, the UE may store a list of message codes. Each message code may be mapped to a specific message content/information.

Step S400 is the same as step S300 in FIG. 16. Step S410 is the same as step S310 in FIG. 16. In step S420, when data/message/signaling is available for bi-directional transmission and/or connectionless transmission, the UE transmits a specific message code based on contention-based or contention-free random access. In step S430, upon correctly receiving the specific message code, the network transmits acknowledge (ACK) to the UE either via random access response message or via physical HARQ indicator channel (PHICH). In step S440, the network node constructs a data/message/signaling based on the received message code. In step S450, the network node transmits the constructed data/message/signaling to another UE.

FIG. 18 shows a method for performing bi-directional transmission and/or connectionless transmission according to another embodiment of the present invention. According to this embodiment, bi-directional transmission and/or connectionless transmission may be performed for communication between UEs via network. According to this embodiment, when data/message/signaling is available for bidirectional transmission and/or connectionless transmission, the UE may perform bidirectional transmission and/or connectionless transmission of MAC PDU indicating bi-directional transmission and/or connectionless transmission, possibly by selecting a radio resource from a set of contention based resources which can be shared by UEs performing bi-directional transmission and/or connectionless transmission. The UE may transmit a scheduling request on PUCCH which is dedicated to bi-directional transmission and/or connectionless transmission, before bi-directional transmission and/or connectionless transmission. Upon receiving resource grant for bi-directional transmission and/or connectionless transmission, the UE may perform bi-directional transmission and/or connectionless transmission based on the received resource grant. In this embodiment, it is assumed that UL transmission is selected. The UE may be in RRC_CONNECTED.

In step S500, the UE receives control information on bi-directional transmission and/or connectionless transmission at a cell. The control information may indicate that the cell supports bi-directional transmission and/or connectionless transmission. The control information may indicate transmission direction, if this transmission corresponds to bi-directional transmission by which the UE can transmit a packet in UL or in SL. The control information may include UL resource pool and/or SL resource pool, used for bi-directional transmission and/or connectionless transmission. The control information may further include a first probability factor controlling whether the UE selects UL or SL for bi-directional transmission and/or a second probability factor controlling whether or not the UE can perform connectionless transmission. The control information may include a set of contention based resources in time and frequency.

In step S510, the UE detects data available for bi-directional transmission and/or connectionless transmission. There may be a specific type of logical/transport channel for bi-directional transmission. There may be a specific logical/transport channel for connectionless transmission, which is called connectionless channel.

In step S520, the UE may optionally transmit a scheduling request on PUCCH which is dedicated to bi-directional transmission and/or connectionless transmission. Before this step, the UE may select UL or SL for bi-directional transmission based on the received first probability factor and/or determine whether or not to perform connectionless transmission based on the received second probability factor. As described above, in this embodiment, the UL transmission is selected.

In step S530, the UE may optionally receive UL grant for bi-directional transmission and/or connectionless transmission. The grant may be received on PDCCH/ePDCCH which includes a specific RNTI specific to bi-directional transmission. Or, the grant may include a CL-RNTI.

In step S540, upon receiving the UL grant, the UE may select a radio resource from the set of contention based resources and performs UL transmission of MAC PDU indicating bi-directional transmission and/or UL connectionless transmission by using the selected resource in order to transmit the data/message/signaling. The LCID field in the header of the MAC PDU may include a specific value indicating bi-directional transmission and/or UL connectionless transmission. Before this step, the UE may select UL or SL for bi-directional transmission based on the received first probability factor and/or determine whether or not to perform connectionless transmission based on the received second probability factor. As described above, in this embodiment, the UL transmission is selected. The data/message/signaling may be transmitted with a digital signature or encryption.

Upon receiving data/message/signaling by UL connectionless transmission, in step S550, a network node (e.g. eNB) determines whether or not to relay the received data/message/signaling to one or more other UE(s) in the cell or in a specific area. The network node may receive similar data/message/signaling from many UEs in the cell from the same UL connectionless channel. The network node may detect duplicated data/message/signaling, so that the network node may not relay all the received ones. Rather, the network node may select one or some of the received ones for relaying. Alternatively, the network node may re-construct a new data/message/signaling based on the received ones, and transmit the re-constructed data/message/signaling to one or more other UEs in the cell or in a specific area.

In step S560, the network node may perform DL transmission either for relaying the received data/message/signaling or for transmitting new data/message/signaling reconstructed based on the received data/message/signaling.

FIG. 19 shows a method for performing bi-directional transmission and/or connectionless transmission according to another embodiment of the present invention. According to this embodiment, connectionless bi-directional transmission between UEs via network may be performed on SL-SCH or SL-DCH. According to this embodiment, when data/message/signaling is available for connectionless bi-directional transmission, the UE may transmit UL data on a SL channel such as SL-SCH or SL-DCH under network control.

In step S600, the UE receives control information on connectionless bi-directional transmission at a cell. The control information may indicate that the cell supports connectionless transmission. The control information may indicate transmission direction, if this transmission corresponds to bi-directional transmission by which the UE can transmit a packet in UL or in SL. The control information may include UL resource pool for connectionless transmission. The control information may further include a first probability factor controlling whether the UE selects UL or SL for bi-directional transmission and/or a second probability factor controlling whether or not the UE can perform connectionless transmission. The control information may include a set of SL TX resources which can be also used for UL transmission towards the network.

In step S610, the UE detects data available for bi-directional transmission and/or connectionless transmission. There may be a specific type of logical/transport channel for bi-directional transmission. There may be a specific logical/transport channel for connectionless transmission, which is called connectionless channel.

In step S620, the UE may transmit a scheduling request on PUCCH which is dedicated to connectionless bi-directional transmission. The UE may further transmit a buffer status report for connectionless bi-directional transmission. Before this step, the UE may select UL or SL for bi-directional transmission based on the received first probability factor and/or determine whether or not to perform connectionless transmission based on the received second probability factor.

In step S630, the UE may receive SL grant or SL TX resources for UL connectionless bi-directional transmission towards the network (possibly as well as SL transmission towards another UE(s)). The SL grant or the SL TX resource may include resources for transmission of scheduling assignment and SL-SCH. Or, the SL grant or the SL TX resource may include resources for transmission of SL-DCH. Or, the SL grant or the SL TX resource may include resources for transmission of SL-BCH. The SL grant may be received on PDCCH/ePDCCH which includes a specific RNTI specific to bi-directional transmission. Or, the grant may include a CL-RNTI.

Upon receiving the SL grant or the SL TX resource, in step S640, the UE may perform transmission of scheduling assignment that schedules transmission of the data/message/signaling towards the network. Another UE may also receive this scheduling assignment. The LCID field in the header of the MAC PDU may include a specific value indicating UL connectionless bi-directional transmission. Before this step, the UE may select UL or SL for bi-directional transmission based on the received first probability factor and/or determine whether or not to perform connectionless transmission based on the received second probability factor.

Upon receiving the SL grant or the SL TX resource, in step S650, the UE may perform UL transmission of MAC PDU via one of SL channels (such as SL-SCH, SL-DCH, SL-BCH) based on the SA in order to transmit the data/message/signaling to the network. Another UE may also receive this MAC PDU on the SL channel. The LCID field in the header of the MAC PDU may include a specific value indicating UL connectionless bi-directional transmission. Before this step, the UE may select UL or SL for bi-directional transmission based on the received first probability factor and/or determine whether or not to perform connectionless transmission based on the received second probability factor. The data/message/signaling may be transmitted with a digital signature or encryption.

Upon receiving data/message/signaling by UL connectionless transmission, in step S660, a network node (e.g. eNB) determines whether or not to relay the received data/message/signaling to one or more other UE(s) in the cell or in a specific area. The network node may receive similar data/message/signaling from many UEs in the cell from the same UL connectionless channel. The network node may detect duplicated data/message/signaling, so that the network node may not relay all the received ones. Rather, the network node may select one or some of the received ones for relaying. Alternatively, the network node may re-construct a new data/message/signaling based on the received ones, and transmit the re-constructed data/message/signaling to one or more other UEs in the cell or in a specific area.

In step S670, the network node may perform DL transmission either for relaying the received data/message/signaling or for transmitting new data/message/signaling reconstructed based on the received data/message/signaling.

FIG. 20 shows a wireless communication system to implement an embodiment of the present invention.

A network node 800 may include a processor 810, a memory 820 and a transceiver 830. The network node 800 may be one of an eNB, a new entity for V2X communication, a new gateway for V2X communication, a RSU, etc. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The UE 900 may be a vehicle. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for a user equipment (UE) in a wireless communication system, the method comprising:
receiving, by a radio resource control (RRC) layer of the UE, control information comprising a first factor and a second factor from a network;
deciding, by a switching layer of the UE, whether to transmit data or not based on the first factor, wherein the switching layer is located between an application layer and a packet data convergence protocol (PDCP) layer; and
when the switching layer of the UE decides to transmit the data based on the first factor:
determining, by the switching layer, one of an uplink (UL) or a sidelink (SL) as a transmission direction based on the second factor;
transmitting the data and information informing that the data is a vehicle-to-everything (V2X) message related to road safety to other UEs on the SL, if the SL is determined as the transmission direction; and transmitting the data and information informing that the data is the V2X message related to the road safety to the network on the UL, if the UL is determined as the transmission direction,
wherein the UE is a vehicle, and
wherein the second factor is determined based on a type of the data.

2. The method of claim 1, wherein the control information is provided per a radio resource control (RRC) state.

3. The method of claim 1, further comprising performing a specific type of communication via the determined one of the UL or the SL.

4. The method of claim 3, wherein the specific type of communication is a vehicular communication between vehicles or between a vehicle and other type of device.

5. The method of claim 4, wherein the other type of device is one of an evolved NodeB (eNB), a new entity for the vehicular communication, a new gateway for the vehicular communication, or a road side unit (RSU).

6. The method of claim 5, wherein the network corresponds to one of an evolved NodeB (eNB), a new entity for the vehicular communication, a new gateway for the vehicular communication, or a RSU.

7. A user equipment (UE) comprising:
a memory;
a transceiver; and
a processor coupled to the memory and the transceiver, and configured to:
decide, by a switching layer of the UE, whether to transmit data or not based on a first factor, wherein the switching layer is located between an application layer and a packet data convergence protocol (PDCP) layer, and
when the UE decides to control the transceiver to transmit the data based on the first factor:
determine, by the switching layer, one of an uplink (UL) or a sidelink (SL) as a transmission direction based on a second factor,
control the transceiver to transmit the data and information informing that the data is a vehicle-to-everything (V2X) message related to road safety to other UEs on the SL, if the SL is determined as the transmission direction, and
control the transceiver to transmit the data and information informing that the data is the V2X message related to the road safety to the network on the UL, if the UL is determined as the transmission direction,
wherein the UE is a vehicle, and
wherein the second factor is determined based on a type of the data.

* * * * *